(12) United States Patent
Kocharlakota et al.

(10) Patent No.: US 10,354,609 B2
(45) Date of Patent: Jul. 16, 2019

(54) FUNCTIONAL MODE AWARE RESOURCE MANAGEMENT

(71) Applicant: Samsung Electronics Co., Ltd, Suwon-si (KR)

(72) Inventors: Sridhar Kocharlakota, Cupertino, CA (US); Moiz Kaizar Sonasath, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 15/257,864

(22) Filed: Sep. 6, 2016

(65) Prior Publication Data

US 2017/0256229 A1 Sep. 7, 2017

Related U.S. Application Data

(60) Provisional application No. 62/302,541, filed on Mar. 2, 2016.

(51) Int. Cl.
*G06T 1/20* (2006.01)
*G06T 1/60* (2006.01)
*G09G 5/00* (2006.01)

(52) U.S. Cl.
CPC ............... *G09G 5/001* (2013.01); *G06T 1/20* (2013.01); *G06T 1/60* (2013.01);
(Continued)

(58) Field of Classification Search
None
See application file for complete search history.

(56) References Cited

U.S. PATENT DOCUMENTS 5,012,409 A * 4/1991 Fletcher ............... G06F 9/4887
718/103
6,054,991 A 4/2000 Crane et al.
(Continued)

FOREIGN PATENT DOCUMENTS

KR 10-2013-0082530 A 7/2018
WO 2004053842 A2 6/2004

OTHER PUBLICATIONS

Colgan ("Switch from VR to the Real World with a Simple Gesture", 2015, http://blog.leapmotion.com/new-demo-switch-vr-real-world-simple-gesture/).*

(Continued)

*Primary Examiner* — Xin Sheng (57) ABSTRACT

An electronic device, method, and computer readable medium for a functional mode aware resource management. The electronic device includes a memory and at least one processor. The at least one processor is coupled to the memory. The at least one processor is configured to identify when an amount of a system resource is below a minimum resource threshold. The at least one processor is also configured determine a functional mode of the electronic device. The at least one processor is further configured to identify one or more processes not corresponding to the functional mode that are running on the electronic device. The at least one processor is further configured to terminate at least one of the one or more processes not corresponding to the functional mode when the amount of the system resource is below the minimum resource threshold.

20 Claims, 6 Drawing Sheets

(52) U.S. Cl.
CPC ... *G09G 2330/021* (2013.01); *G09G 2340/04* (2013.01); *G09G 2340/0428* (2013.01); *G09G 2360/08* (2013.01)

(56) References Cited

U.S. PATENT DOCUMENTS

| | | |
|---|---|---|
| 6,809,738 B2 | 10/2004 | Hubrecht et al. |
| 6,924,815 B2 | 8/2005 | Akazawa et al. |
| 7,301,547 B2 | 11/2007 | Martins et al. |
| 7,646,790 B2 | 1/2010 | Minami et al. |
| 8,072,458 B2 | 12/2011 | Takizawa et al. |
| 8,696,437 B2 | 4/2014 | Anderson et al. |
| 9,052,967 B2 | 6/2015 | Gao et al. |
| 9,069,575 B2 | 6/2015 | Mandyam et al. |
| 9,081,534 B2 | 7/2015 | Yuen et al. |
| 9,122,707 B2 | 9/2015 | Wither et al. |
| 9,285,955 B2 | 3/2016 | Nezu et al. |
| 9,311,768 B2 | 4/2016 | Stevens et al. |
| 9,320,967 B2 | 4/2016 | Knutsson |
| 9,330,268 B2 | 5/2016 | Yoon |
| 9,330,478 B2 | 5/2016 | Anderson |
| 2003/0055863 A1 | 3/2003 | Spiegel et al. |
| 2007/0067530 A1 | 3/2007 | Siegwart |
| 2012/0324481 A1 | 12/2012 | Xia et al. |
| 2013/0054895 A1 | 2/2013 | Tuch et al. |
| 2013/0054922 A1 | 2/2013 | Tuch et al. |
| 2013/0083064 A1 | 4/2013 | Geisner et al. |
| 2013/0097598 A1 | 4/2013 | Schroeder et al. |
| 2013/0208080 A1* | 8/2013 | Lukasik ............... H04N 7/15 348/14.09 |
| 2013/0257686 A1 | 10/2013 | Baron et al. |
| 2014/0143791 A1 | 5/2014 | Mark et al. |
| 2014/0208328 A1* | 7/2014 | Chen ................. G06F 9/485 718/103 |
| 2015/0323986 A1* | 11/2015 | Frank ................ G06F 17/28 713/323 |
| 2017/0112433 A1* | 4/2017 | Pugh ................... G02C 7/04 |
| 2018/0205593 A1 | 7/2018 | Livschitz et al. |

OTHER PUBLICATIONS

Tipbot ("Master notifications in Android Lollipop with Notification Priority and Downtime", 2014, https://www.greenbot.com/article/2854634/master-notifications-in-android-lollipop-with-notification-priority-and-downtime.html).*

Foreign Communication from Related Counterpart Application; PCT Application No. PCT/KR2017/002281; International Search Report dated May 26, 2017; 3 pages.

Foreign Communication from Related Counterpart Application; PCT Application No. PCT/KR2017/002281; Written Opinion of the international Searching Authority dated May 26, 2017; 6 pages.

Brinkmann, M., "Do 'Game Boosters' Improve PC Gaming Performance?" ghacks.net, http://www.ghacks.net/2015/05/23/do-game-boosters-improve-pc-gaming-performance/, May 23, 2015, 13 pages.

Regan, M., et al., "Display Memory Access Issues and Anti-Aliasing with a Virtual Reality Graphics Controller," Department of Computer Science, Monash University, Australia, 1994, pp. 23-27.

"How to Use Wise Game Booster to Improve Game Performance," The User Guide of Wise Game Booster-How to Improve Game Performance, http:www.wisecleaner.com/wise-game-booster-user-guide.html, 2016, 3 pages.

European Patent Office, "Supplementary European Search Report," Application No. EP 17760326.3, dated Nov. 12, 2018, 16 pages.

* cited by examiner

| Application State (oom_adj) | Memory Threshold (minfree) |
|---|---|
| Foreground | 76 MB |
| Visible | 92 MB |
| Service | 112 MB |
| Hidden | 120 MB |
| Content Provider | 140 MB |
| Empty App | 184 MB |

FIG. 6

| | Application State (oom_adj) | Memory Threshold (minfree) | |
|---|---|---|---|
| VR | Foreground | 20 MB | 90 MB |
| | Visible | 42 MB | |
| | Service | 60 MB | |
| | Hidden | 70 MB | |
| | Content Provider | 80 MB | |
| | Empty App | 90 MB | |
| | Application State (oom_adj) | Memory Threshold (minfree) | |
| NONVR | Foreground | 100 MB | 184 MB |
| | Visible | 120 MB | |
| | Service | 130 MB | |
| | Hidden | 140 MB | |
| | Content Provider | 160 MB | |
| | Empty App | 184 MB | |

FIG. 7

FUNCTIONAL MODE AWARE RESOURCE MANAGEMENT

CROSS-REFERENCE TO RELATED APPLICATION AND CLAIM OF PRIORITY

This application claims priority under 35 U.S.C. § 119(e) to U.S. Provisional Patent Application No. 62/302,541 filed on Mar. 2, 2016. The above-identified provisional patent application is hereby incorporated by reference in its entirety.

TECHNICAL FIELD

This disclosure relates generally to virtual reality. More specifically, this disclosure relates to a method and apparatus for virtual reality (VR) aware resource management.

BACKGROUND

Virtual reality (VR) and augmented reality (AR) applications are becoming more prevalent. It would be desirable if the operating system of a device took into account the functional mode of the device (e.g., VR or AR mode) in managing the resources of the device.

SUMMARY

This disclosure provides a virtual reality (VR) aware resource management.

In a first embodiment, an electronic device is provided for a functional mode aware resource management. The electronic device includes a memory and at least one processor. The at least one processor is coupled to the memory. The at least one processor is configured to identify when an amount of a system resource is below a minimum resource threshold. The at least one processor is also configured to determine a functional mode of the electronic device. The at least one processor is further configured to identify one or more processes not corresponding to the functional mode that are running on the electronic device. The at least one processor is further configured to terminate at least one of the one or more processes not corresponding to the functional mode when the amount of the system resource is below the minimum resource threshold.

In a second embodiment, a method is provided for a functional mode aware resource management. The method includes identifying when an amount of a system resource is below a minimum resource threshold. The method also includes determining a functional mode of an electronic device. The method further includes identifying one or more processes not corresponding to the functional mode that are running on the electronic device. The method further includes terminating at least one of the one or more processes not corresponding to the functional mode when the amount of the system resource is below the minimum resource threshold.

In a third embodiment, a non-transitory medium embodying a computer program is provided for a functional mode aware specific resource management. The program code, when executed by at least one processor, causes the electronic device to identify when an amount of a system resource is below a minimum resource threshold. The program code, when executed by at least one processor, also causes the electronic device to determine a functional mode of an electronic device. The program code, when executed by at least one processor, further causes the electronic device to identify one or more processes not corresponding to the functional mode that are running on the electronic device. The program code, when executed by at least one processor, further causes the electronic device to terminate at least one of the one or more processes not corresponding to the functional mode when the amount of the system resource is below the minimum resource threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The present disclosure provides to create a functional awareness (e.g. virtual reality (VR), augmented reality (AR), or other different modes for an electronic device) in subsystems of the electronic device's subsystems to manage different system resources more efficiently, leading to improved performance, power consumption and user experience. The functionality awareness is used, for example, in managing memory, specifically in situations where the electronic device is operating with a low system memory, and preserving a better user experience for different functional modes, such as virtual reality, augmented reality, or any other mode a cell phone can operate. The functional awareness is extended to, for example, display management (e.g., higher display resolution in VR or AR mode compared to phone mode), power management (e.g., turn on cooling devices such as fans when the devices turns hot). The embodiments of the present disclosure preserves the users' experience in functional modes, such as virtual reality and augmented reality, during low memory situations.

Figure 1:
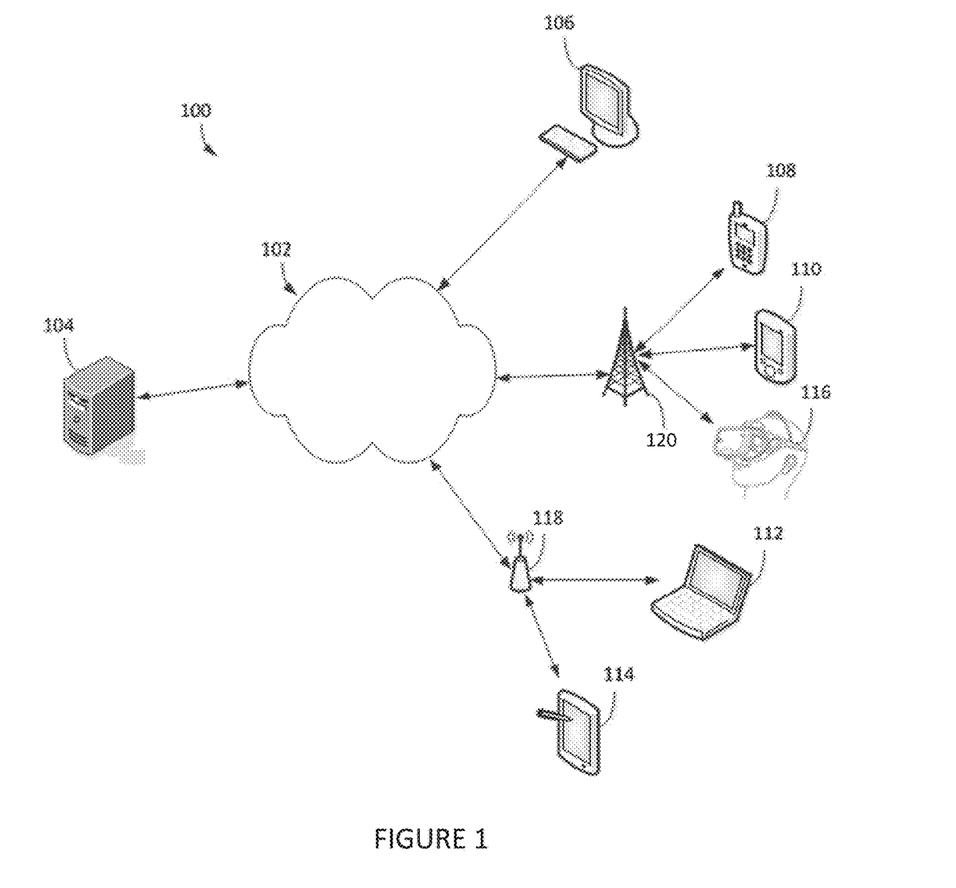
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-116. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-116 represents any suitable computing or communication device that interacts with at least one server or other computing device(s) over the network 102. In this example, the electronic devices 106-116 include electronic devices, such as, for example, a desktop computer 106, a mobile telephones or smartphones 108, a personal digital assistant (PDA) 110, a laptop computer 112, a tablet computer 114, a VR headset 116, a wearable device, smart watch, etc. However, any other or additional electronic devices could be used in the communication system 100.

In this example, some electronic devices 108-116 communicate indirectly with the network 102. For example, the electronic devices 108-110 and 116 communicate via one or more base stations 120, such as cellular base stations or eNodeBs. Also, the electronic devices 112-114 communicate via one or more wireless access points (APs) 118, such as IEEE 802.11 wireless APs, Bluetooth, and Wifi direct. Note that these are for illustration only and that each electronic device could communicate directly with the network 102 or indirectly with the network 102 via any suitable intermediate device(s) or network(s).

As described in more detail below, when the electronic device 116 is operating in a functional mode, the resource management application controls the system resources to ensure a user's experience is not diminished unnecessarily when the electronic device experiences low system resources.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
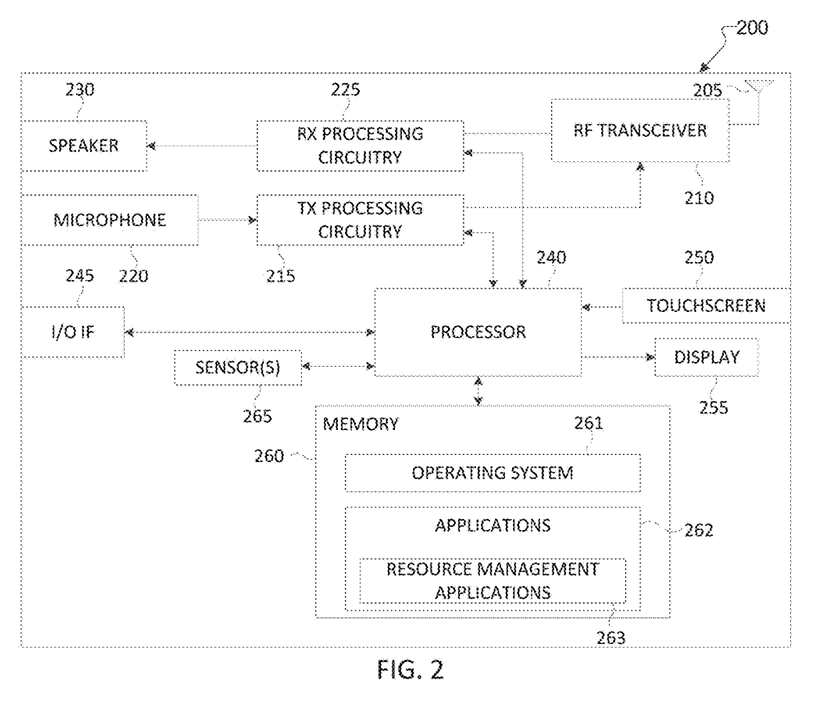
FIG. 2 illustrates an example electronic device according to various embodiments of the present disclosure.

FIG. 2 illustrates an example electronic device in a communication system according to various embodiments of the present disclosure. In particular, FIG. 2 an example electronic device 116. The electronic device 116 could represent one or more of the electronic devices 106-116 in FIG. 1.

As shown in FIG. 2, the electronic device 116 includes an antenna 205, a radio frequency (RF) transceiver 210, transmit (TX) processing circuitry 215, a microphone 220, and receive (RX) processing circuitry 225. The electronic device 116 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processors and execute the OS program 261 stored in the memory 260 in order to control the overall operation of the electronic device 200. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor can execute a resource management application 263 for monitoring system resources. The processor 240 is also coupled to the I/O interface 245, which provides the electronic device 200 with the ability to connect to other devices such as laptop computers, handheld computers and other accessories, for example, a VR headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the display 255. The operator of the electronic device 200 can use the input 250 (e.g., keypad, touchscreen, button etc.) to enter data into the electronic device 200. The display 255 may be a liquid crystal display, a light-emitting diode (LED) display, an optical LED (OLED), an active matrix OLED (AMOLED), or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

Electronic device 200 further includes one or more sensors 265 that can meter a physical quantity or detect an activation state of the electronic device 200 and convert metered or detected information into an electrical signal. For example, sensor 265 may include one or more buttons for touch input, e.g., on the headset or the electronic device 200, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 265 can further include a control circuit for controlling at least one of the sensors included therein. The electronic device 200 can be used as a head mounted device (HMD). Any of these sensor(s) 265 may be located within the electronic device 200, within a headset configured to hold the electronic device 200, or in both the headset and electronic device 200, for example, in embodiments where the electronic device 200 includes a headset.

As described in more detail below, when the electronic device 200 detects a low amount of system resources, the electronic device 200 executes a resource management application 263 to manage the system resources while not diminishing the user's experience.

Although FIG. 2 illustrates an example of an electronic device in a communication system, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 200 configured as a mobile telephone or smartphone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3:
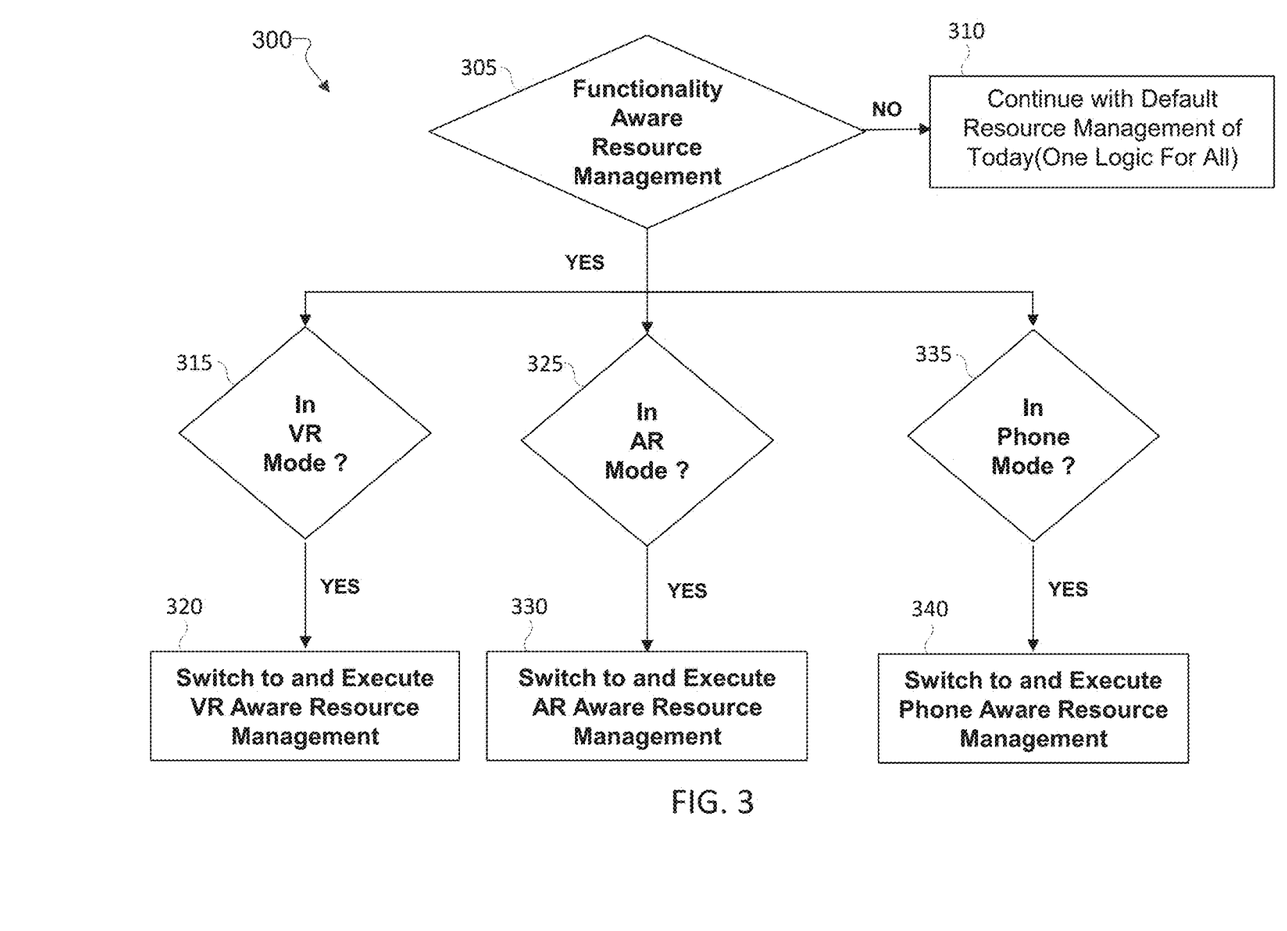
FIG. 3 illustrates an example process for determining a functional mode resource management application to use in an electronic device according to this disclosure.

FIG. 3 illustrates an example process 300 for determining a functional mode resource management application to use in an electronic device according to this disclosure. For example, the process depicted in FIG. 3 may be performed by electronic device 200 in FIG. 2; the process may also be implemented by client devices 106-116 in FIG. 1.

In operation 305, the electronic device 200 operates in a functionality aware resource management mode and determines whether the electronic device 200 is operating using a functional mode. The functional mode of the electronic device 200 is determined by the operating system 261 detecting different hardware or software currently in use. Examples of functional modes include virtual reality (VR), augmented reality (AR), internet of things (IoT), connected car, or phone mode, among any other mode that an electronic device 200 can operate. The functional modes each have different requirements for operating. For example, a VR mode might require greater screen resolution, while a music player might require a higher sampling rate of the speakers.

Different resources, including memory, sensors, display, power management and thermal management could also define different functional modes. A resource management application 263 of a particular system resource can be made functionally aware and the logic can change dynamically depending on the functionality mode. For example, VR or AR modes require very high display resolution, but a phone mode does not. A display management application 263 switches to a higher resolution in VR or AR modes and switches to a lower resolution in phone mode. A sensor management application 263 would require a higher precision for a gyroscope using VR mode when compared to a phone based on the critical nature of position tracking in VR. A power management application 263 could switch off different hardware components, switch to a VR specific power governor, or switch to a VR specific frequency governor for optimal power in VR mode. A thermal management application 263 might enable additional cooling devices for extreme cooling steps based on graphic intensive VR applications that would greatly heat the electronic device 200.

In operation 310, the electronic device 200 does not detect any functional mode and operates with a default resource management application 263. The electronic device 200 can be operating, for example, in a standby mode or operating applications 262 or processes that do not require a specialized functional mode. In certain embodiments, the electronic device 200, when a system resource is not detected outside a minimum resource threshold, uses a default resource management application 263 regardless of the functional mode.

In operation 315, the electronic device 200 detects that the functional mode is in VR mode. The electronic device 200 can detect a VR mode through the hardware or software currently being operated. For example, when the electronic device 200 is connected to a headset, the electronic device 200 recognizes the VR application through the I/O interface 245, such as a USB port. Also for example, the electronic device 200 can recognize that an application 262 running in the foreground is a VR application. The electronic device 200 can also use a combination of hardware and software to determine the functional mode is in VR mode.

In operation 320, the electronic device 200 switches to a VR aware resource management mode. When in a VR mode, the electronic device 200 manages the currently running processes and hardware for preserving or optimizing the user's VR experience. While the default resource management application 263 might try to terminate service applications related to VR before visible applications not related to VR based on a priority of application states, the VR resource management application 263 would recognize the priority for the user's experience in VR mode.

In operation 325, the electronic device 200 detects that the functional mode is in AR mode. The electronic device 200 can detect an AR mode through the hardware or software currently being operated. For example, when the electronic device 200 is connected to a headset, the electronic device 200 recognizes the AR application through use of a sensor 265, such as a camera sensor. Also for example, the electronic device 200 can recognize that an application 262 running in the foreground is an AR application. The electronic device 200 can also use a combination of hardware and software to determine the functional mode is in AR mode.

In operation 330, the electronic device 200 switches to an AR aware resource management mode. When in AR mode, the electronic device 200 manages the currently running processes and hardware for preserving or optimizing the user's AR experience. While the default resource management application 263 might try to terminate service applications related to AR before visible applications not related to AR based on a priority of application states, the AR resource management application 263 would recognize the priority for the user's experience in AR mode.

In operation 335, the electronic device 200 detects that the functional mode is in phone mode. The electronic device 200 can detect a phone mode through the hardware or software currently being operated. For example, when the electronic device 200 is connected to a headset, the electronic device 200 recognizes the phone application through the I/O interface 245, such as an audio connection or headphone port, or through the microphone 220 and speaker 230 operating. Also for example, the electronic device 200 can recognize that an application 262 running in the foreground is a phone application. The electronic device 200 can also use a combination of hardware and software to determine the functional mode is in phone mode.

In operation 340, the electronic device 200 switches to a phone aware resource management mode. When in a phone mode, the electronic device 200 manages the currently running processes and hardware for preserving or optimizing the user's phone experience. While the default resource management application 263 might try to terminate service applications related to phone before visible applications not related to phone based on a priority of application states, the phone resource management application 263 would recognize the priority for the user's experience in phone mode.

Although FIG. 3 illustrates an example of process for determining a functional mode resource management application to use in an electronic device according to a functional mode of the electronic device, respectively, various changes could be made to FIG. 3. For example, while shown as a series of steps, various steps could overlap, occur in parallel, occur in a different order, or occur multiple times. Also, the functional modes chosen in FIG. 3 are for illustrations only, and more or less than the illustrated amount of functional modes can be implemented in the determination of the functional mode. The functional modes can include the illustrated embodiments or any functional modes that operate in an electronic device 200.

Figure 4:
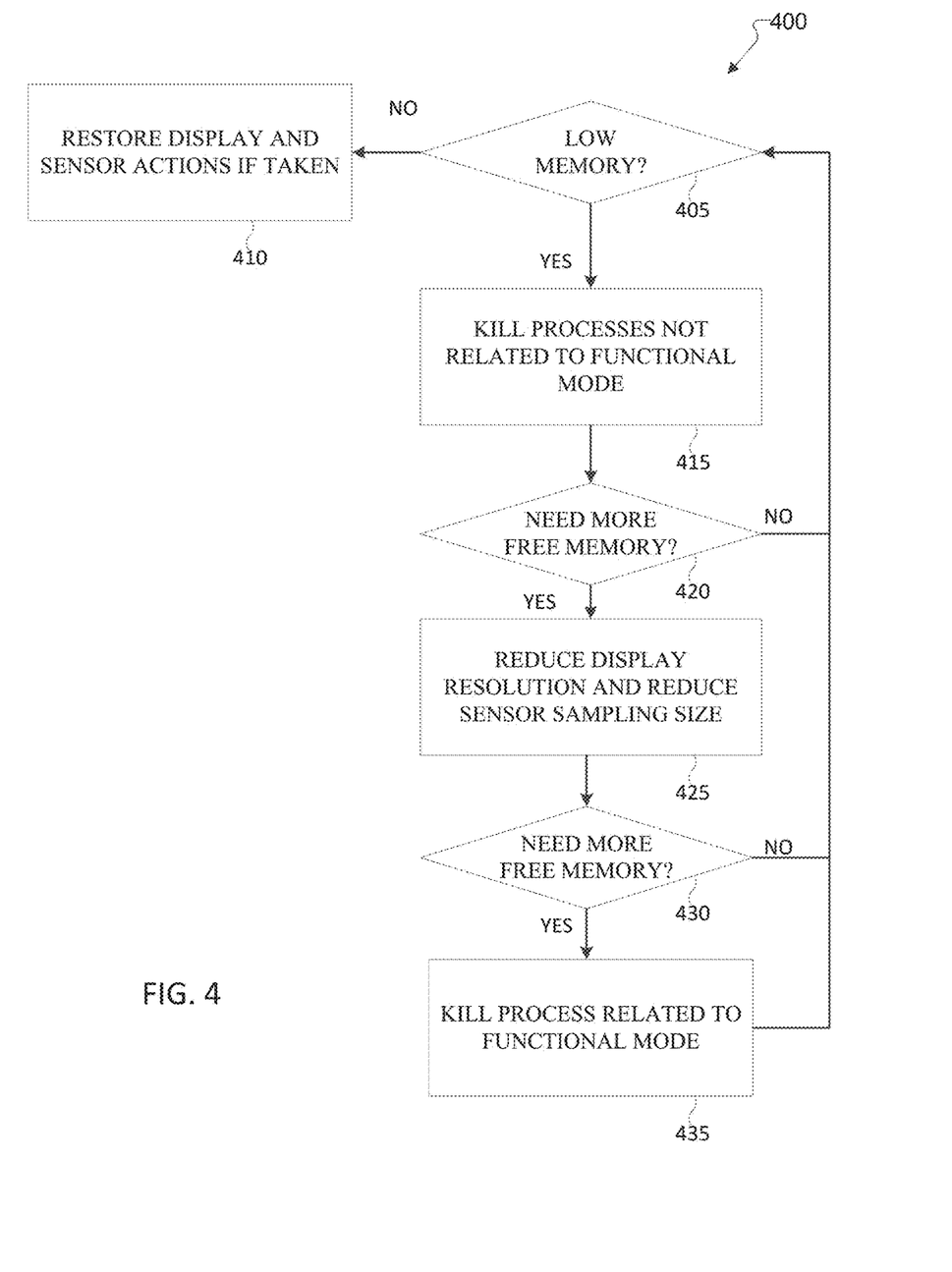
FIG. 4 illustrates an example process for prioritizing process to terminate while the electronic device experiences low system resources according to this disclosure.

FIG. 4 illustrates an example process 400 for prioritizing process to terminate while the electronic device experiences low system resources according to this disclosure. For example, the process depicted in FIG. 4 may be performed by electronic device 200 in FIG. 2; the process may also be implemented by client devices 106-116 in FIG. 1.

In operation 405, the electronic device 200 detects a low amount of available system resources. A low amount of system resources is defined when an available system resource is outside a resource threshold. Examples, of system resources include memory, display, sensors, power management, thermal management, etc. For example, the electronic device 200 could require a minimum amount of memory for operating in a specific functional mode, a minimum resolution of a display 255, a minimum sampling rate of a sensor 265 or different sensors 265, a minimum power level for power management, or range of operating temperatures for thermal management. In operation 410, the electronic device 200 restores the display resolution of the display 255 when the system resources are not outside the minimum resources threshold.

In operation 415, the electronic device 200 kills or terminates processes related to the non-functional mode 615 when the system resources are outside the minimum resources threshold. For example, when the electronic device 200 is operating in VR mode, processes that are not relevant to VR are terminated before the processes that related to VR. The processes of the non-functional mode 615 can be furthered order by importance to the operating system 261 or the user experience. For example, an application 262 that is defined in a content provider application state might be terminated before an application 262 that is defined in a visible application state.

In operation 420, the electronic device 200 determines whether the system resources are still outside the minimum resources threshold after all the processes related to the non-functional mode 615 are killed or terminated. If the electronic device 200 determines that the system resources are within the minimum resources threshold, the electronic device returns to operation 405.

In operation 425, the electronic device 200 reduces a display resolution of a display 255 or reduces a sampling size of a sensor 265 if the resources are determined outside the minimum threshold and all the currently operating processes are related to the functional mode 605. For example, while in phone mode, the display 255 resolution of the display 255 might be greater than is perceivable by the human eye and lowering the resolution would not affect the user's experience.

In operation 430, the electronic device 200 determines whether the system resources are outside the minimum resources threshold and adjusting the display resolution or a sampling size of the sensors 265 would negatively affect the functional mode or the experience of the user. If the electronic device 200 determines that the system resources are within the minimum resources threshold, the electronic device returns to operation 405. For example, the display resolution is reduced to the maximum perceivable resolution before the user experience is degraded and the sampling sizes of the sensors are reduced to a minimum. The resource management application 263 determines that the system resources continue to remain outside the minimum resource threshold.

In operation 435, the electronic device 200 kills or terminates process related to the functional mode when the system resources are determined outside the minimum resources threshold and adjusting the display resolution or a sampling size of the sensors 265 would affect the functional mode or the experience of the user. The resource management application 263 terminates processes related to the functional mode. The processes are terminated based on the application state related to the process. The resource management application 263 terminates the processes based on the importance in the operating system and the user's experience.

Although FIG. 4 illustrates examples of processes for prioritizing process to terminate while the electronic device experiences low system resources, respectively, various changes could be made to FIG. 4. For example, while shown as a series of steps, various steps could overlap, occur in parallel, occur in a different order, or occur multiple times.

Figure 5:
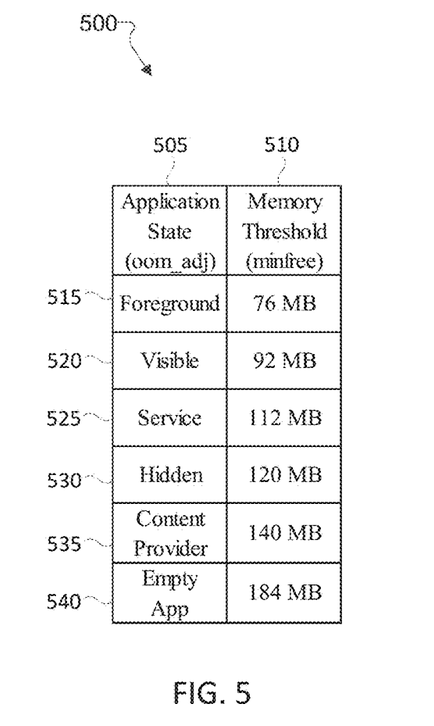
FIGS. 5 and 6 illustrate examples of tables default resource management and functional mode management according to various embodiments of the present disclosure.
Figure 6:
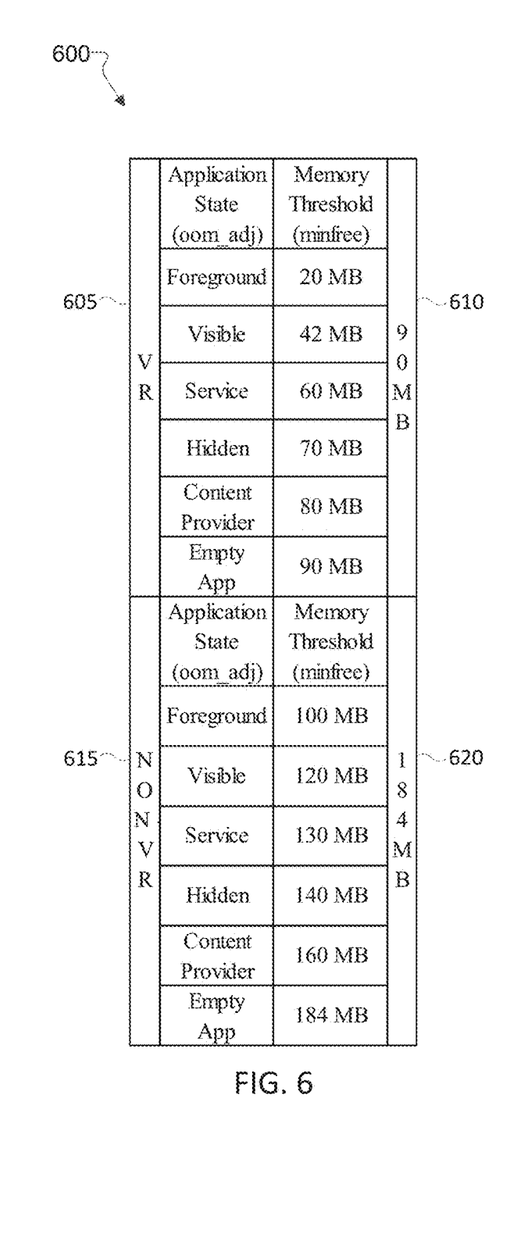

FIGS. 5 and 6 illustrate examples of tables default resource management 500 and functional mode management 600 according to various embodiments of the present disclosure. In particular, FIGS. 5 and 6 are examples of tables for default resource management 500 and functional mode management 600 for terminating processes in an electronic device 200.

The default resource management table 500 and the functional mode resource management table 600 include application states 505 and resource thresholds 510. The application state 505 is used to determine the priority of specific processes for applications 262 that are currently operating. Examples of application states 505 include foreground applications 515, visible applications 520, service applications 525, hidden applications 530, content provider applications 535, and empty application 540.

Each application state 505 is associated with a resource threshold 510. The resource threshold 510 is also referred to as a minimum resource threshold for a specific application state 505. Using the memory threshold 510 in FIG. 5, the default resource management application 263 will begin to terminate empty applications 540 once the available memory 260 drops below 184 MB. If all the empty applications 540 are terminated and the available memory 260 is above the content provider application's 535 minimum resource threshold 510, the default resource management application 263 determines that the memory is sufficient for the user's experience.

In the same example, when all the empty applications are terminated and the available memory is still below the content provider application's 535 minimum resource threshold 510, the default resource management application 263 would continue terminating processes until the available memory 260 is greater than the resource threshold 510 for the application state 505 of any remaining process for running applications 262. The default resource management application 263 terminates apps based on the default resource management table 500 regardless of user experience or functional mode 605. Thus, a service application 525 related to VR would be terminated before a visible application 520 not related to VR, negatively affecting the user's VR experience.

The functional mode resource management table 600 also includes a functional mode 605, a functional mode threshold 610, a non-functional mode 615, and a non-functional mode threshold 620. The functional mode resource management table 600 is used when operating in a functional mode 605, such as VR mode, AR mode, phone mode, or any other mode operated by an electronic device 200. The functional mode resource management table 600 prioritizes processes for running applications 262 related to the functional mode 605 over processes for non-functional mode applications 615. Using the same applications in the previous example, the VR resource management application 263 would terminate the process for the visible application 505 related to the non-VR mode 615 before the process for the service application 525 related to the VR-mode 605. The VR resource management application 263 does not diminish the user's experience in VR mode.

The functional mode threshold 610 is the amount of resources that less available resources are required, without any processes for running applications 262 related to the non-functional mode 615, for terminating processes for applications 262 related to the functional mode 605. The non-functional mode threshold 610 is the amount of resource that less available resources are required for terminating processes for applications 262 related to the non-functional mode 615.

Although FIGS. 5 and 6 illustrate examples of resource management tables for default resource management 500 and functional mode management 600, various changes may be made to FIGS. 5 and 6. For example, various components in FIGS. 5 and 6 could be combined, further subdivided, or omitted and additional components could be added according to particular needs. As a particular example, the resource management tables for default resource management 500 and functional mode management 600 could be further divided to include more application states 505, or could include different resource threshold levels 510. In addition, as with computing and communication networks, resource management tables for default resource management 500 and functional mode management 600 can come in a wide variety of configurations and FIGS. 5 and 6 do not limit this disclosure to any particular electronic device.

Figure 7:
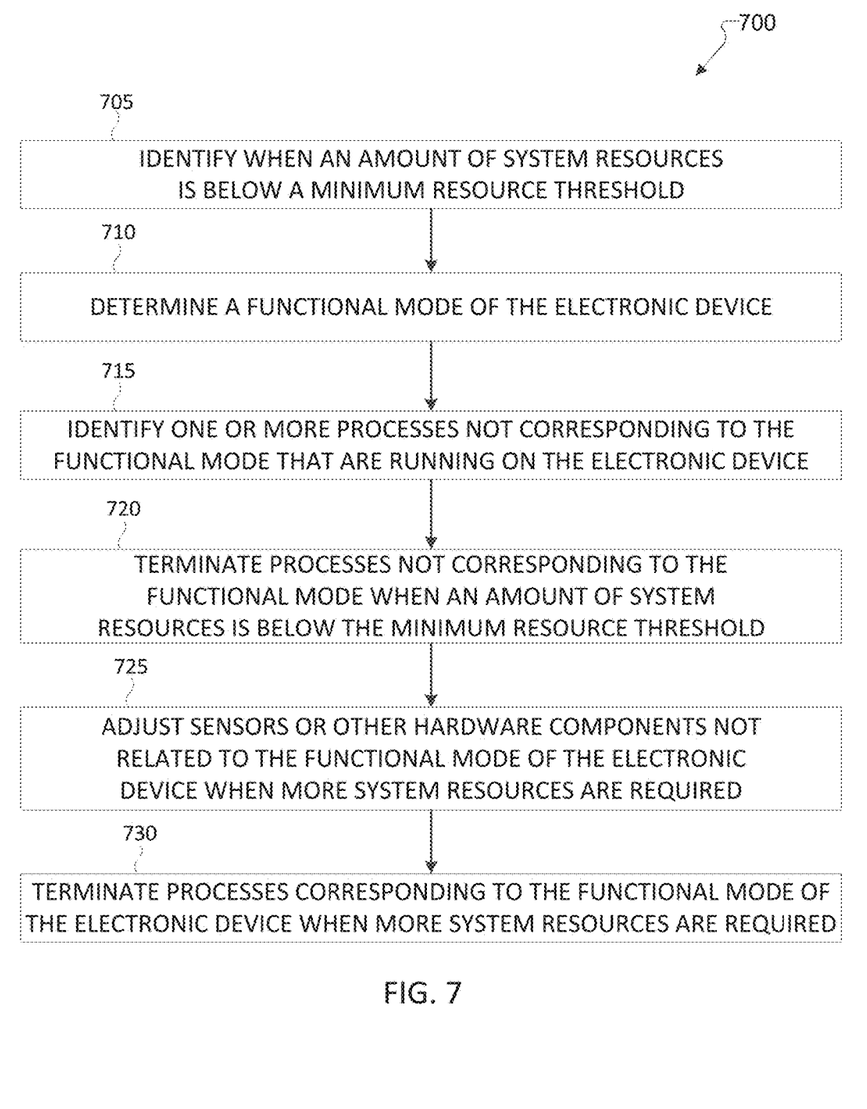
FIG. 7 illustrates an example process for managing system resources using a resource management application according to this disclosure.

FIG. 7 illustrates an example process 700 for managing system resources using a resource management application according to this disclosure. For example, the process depicted in FIG. 7 may be performed by electronic device 200 in FIG. 2; the process may also be implemented by client devices 106-116 in FIG. 1.

In operation 705, the electronic device 200 identifies when an amount of system resources is below a minimum resource threshold. A low amount of system resources is defined when available system resources are outside a minimum resource threshold. Examples, of system resources include memory 260, display 255, sensors 265, power management, thermal management, etc. For example, the electronic device 200 could require a minimum amount of memory 260 for operating in a specific functional mode 605, a minimum resolution of a display 255, a minimum sampling rate of a sensor 265 or different sensors 265, a minimum power level for power management, or range of operating temperatures for thermal management.

In operation 710, the electronic device 200 determines a functional mode 605 of the electronic device 200. The functional mode of the electronic device 200 is determined by the electronic device 200 detecting different hardware or software currently in use. Examples of functional modes include virtual reality (VR) mode, augmented reality (AR) mode, internet of things (IoT) mode, connected car mode, or phone mode, among others. The functional modes each have different requirements for operating. For example, a VR mode might require greater screen resolution, while a music player mode might require a higher sampling rate of the speakers. If the electronic device 200 does not detect a functional mode 605, a default resource management application 263 uses the default resource management table 500 for terminating processes for running applications 262.

If the electronic device 200 does detect a functional mode 605, a functional mode resource management application 263 is used. For example, when the electronic device 200 is connected to a headset, the electronic device 200 recognizes the VR application through the I/O interface 245, such as a USB port; the AR application through use of a sensor 265, such as a camera sensor; or the phone application through the I/O interface 245, such as an audio connection or headphone port, or through the microphone 220 and speaker 230 operating. Also for example, the electronic device 200 can recognize that an application 262 running in the foreground is a VR, AR, or phone application. The electronic device 200 can also use a combination of hardware and software to determine the functional mode is in functional mode 605.

In operation 715, the electronic device 200 identifies one or more processes not corresponding to the functional mode 605 that are running on the electronic device. The processes are corresponding to application states 505 that are related to non-functional mode 615.

In operation 720, the electronic device 200 terminates processes not corresponding to the functional mode 605 of the electronic device 200. The electronic device 200 uses the priority of the process for the running applications 262 based on the functional mode resource management table 600.

In operation 725, the electronic device 200 adjusts sensors 265 and other hardware components not corresponding to the functional mode 605 of the electronic device 200 when more system resources are required. The electronic device 200 determines that the sampling rates of sensors 265 or the display resolution of a display 255 can be adjusted to increase the system resources while the available system resources are less than the functional mode threshold 610.

In operation 730, the electronic device 200 terminates processes related to the functional mode 605 of the electronic device 200 when more system resources are required. If the sensors 265 and display 255 are adjusted the most possible and the available resources are still less than the functional mode threshold 610, the electronic device 200 terminates the process related to the functional mode 605. The processes are terminated based on the priority of the related application state 505 until the available resources are greater than the memory threshold 510 for the application states 510 related processes.

Although FIG. 7 illustrates an example process 700 for managing system resources using a resource management application, respectively, various changes could be made to FIG. 7. For example, while shown as a series of steps, various steps could overlap, occur in parallel, occur in a different order, occur multiple times, or not be performed in certain embodiments.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
a memory; and
at least one processor coupled to the memory, the at least one processor configured to:
identify when an amount of a system resource is below a minimum resource threshold;
determine a functional mode of the electronic device;
identify one or more processes not corresponding to the functional mode that are running on the electronic device;
determine an application state of each application corresponding to the one or more processes;
terminate at least one of the one or more processes not corresponding to the functional mode when the amount of the system resource is below the minimum resource threshold, wherein the functional mode of a process overrides a priority value of the process;
determine whether all processes not corresponding to the functional mode are terminated; and
when all processes not corresponding to the functional mode are terminated, terminate at least one or more processes corresponding to the functional mode when the amount of the system resource is below the minimum resource threshold in accordance with the priority value of the process.

2. The electronic device of claim 1, wherein the at least one processor is further configured to:
select the at least one of the one or more processes not correspond to the function mode to terminate based on the application state.

3. The electronic device of claim 1, wherein the at least one processor is further configured to:
when processes running on the electronic device are related to the functional mode, determine constraints on the system resource related to at least one hardware component; and
adjust at least one process related to the at least one hardware component based on the functional mode.

4. The electronic device of claim 3, wherein to adjust at least one process related to the at least one hardware component, the at least one processor is further configured to reduce a resolution of a display of the electronic device to increase the system resource.

5. The electronic device of claim 3, wherein to adjust at least one process related to the at least one hardware component, the at least one processor is further configured to reduce a sampling rate of at least one sensor of the electronic device to increase the system resource.

6. The electronic device of claim 1, wherein the functional mode comprises one of virtual reality (VR) mode, augmented reality (AR) mode, internet of things (IoT) mode, and a connected car mode.

7. The electronic device of claim 1, wherein the system resource comprises at least one of the memory, a display, one or more sensors, power management, or thermal management.

8. A method for a functional mode aware resource management comprising:
identifying when an amount of a system resource is below a minimum resource threshold;
determining a functional mode of an electronic device;
identifying one or more processes not corresponding to the functional mode that are running on the electronic device;
determining an application state of each application corresponding to the one or more processes;
terminating at least one of the one or more processes not corresponding to the functional mode when the amount of the system resource is below the minimum resource threshold, wherein the functional mode of a process overrides a priority value of the process;
determining whether all processes not corresponding to the functional mode are terminated; and
when all processes not corresponding to the functional mode are terminated, terminating at least one or more processes corresponding to the functional mode when the amount of the system resource is below the minimum resource threshold in accordance with the priority value of the process.

9. The method of claim 8, further comprising:
determining an application state of an application corresponding to the one or more processes; and
selecting the at least one of the one or more processes to terminate based on the application state.

10. The method of claim 8, further comprising:
when processes running on the electronic device are related to the functional mode, determining constraints on the system resource related to at least one hardware component; and
adjusting at least one process related to the at least one hardware component based on the functional mode.

11. The method of claim 10, wherein adjusting at least one process related to the at least one hardware component comprises reducing a resolution of a display of the electronic device to increase the system resource.

12. The method of claim 10, wherein adjusting at least one process related to the at least one hardware component comprises reduce a sampling rate of at least one sensor of the electronic device to increase the system resource.

13. The method of claim 8, wherein the functional mode is one of virtual reality (VR) mode, augmented reality (AR) mode, internet of things (IoT) mode, or a connected car mode.

14. The method of claim 8, wherein the system resource comprises at least one of a memory, a display, one or more sensors, power management, or thermal management.

15. A non-transitory computer readable medium including a plurality of instructions that, when executed by a processor, causes the processor to:
identify when an amount of a system resource is below a minimum resource threshold;
determine a functional mode of an electronic device;
identify one or more processes not corresponding to the functional mode that are running on the electronic device;
determine an application state of each application corresponding to the one or more processes;
terminate at least one of the one or more processes not corresponding to the functional mode when the amount of the system resource is below the minimum resource threshold, wherein the functional mode of a process overrides a priority value of the process;
determine whether all processes not corresponding to the functional mode are terminated; and
when all processes not corresponding to the functional mode are terminated, terminate at least one or more processes corresponding to the functional mode when the amount of the system resource is below the minimum resource threshold in accordance with the priority value of the process.

16. The non-transitory computer readable medium of claim 15, wherein the plurality of instructions is further configured to cause the processor to:
determine an application state of an application corresponding to the one or more processes; and
select the at least one of the one or more processes to terminate based on the application state.

17. The non-transitory computer readable medium of claim 15, wherein the plurality of instructions is further configured to cause the processor to:
when processes running on the electronic device are related to the functional mode, determine constraints on the system resource related to at least one hardware component; and
adjust at least one process related to the at least one hardware component based on the functional mode.

18. The non-transitory computer readable medium of claim 17, wherein the plurality of instructions that causes the processor to adjust at least one process related to the at least one hardware component, is further configured to cause the processor to reduce a resolution of a display of the electronic device to increase the system resource.

19. The non-transitory computer readable medium of claim 17, wherein the plurality of instructions that causes the processor to adjust at least one process related to the at least one hardware component, is further configured to cause the processor to reduce a sampling rate of at least one sensor of the electronic device to increase the system resource.

20. The non-transitory computer readable medium of claim 15, wherein the functional mode is one of virtual reality (VR) mode, augmented reality (AR) mode, internet of things (IoT) mode, or a connected car mode.

* * * * *